US007707488B2

(12) United States Patent
Gurcan et al.

(10) Patent No.: US 7,707,488 B2
(45) Date of Patent: Apr. 27, 2010

(54) ANALYZING LINES TO DETECT TABLES IN DOCUMENTS

(75) Inventors: Ahmet Gurcan, Mercer Island, WA (US); Eric S. Leese, Seattle, WA (US); Jeffrey G. Brown, Auburn, WA (US); Jerry J. Dunietz, Seattle, WA (US); Jesse D. McGatha, Sammamish, WA (US); Khaled S. Sedky, Sammamish, WA (US); Ming Liu, Redmond, WA (US); Oliver H. Foehr, Mercer Island, WA (US); Rodrigo Lopez, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1114 days.

(21) Appl. No.: 11/350,614

(22) Filed: Feb. 9, 2006

(65) Prior Publication Data

US 2007/0186152 A1 Aug. 9, 2007

(51) Int. Cl.
*G06F 17/20* (2006.01)
*G06K 9/00* (2006.01)

(52) U.S. Cl. ........................ 715/227; 715/228; 382/180

(58) Field of Classification Search ................. 382/180; 715/227, 228
See application file for complete search history.

(56) References Cited

U.S. PATENT DOCUMENTS

| | | | | |
|---|---|---|---|---|
| 5,392,130 | A * | 2/1995 | Mahoney | 358/400 |
| 5,774,584 | A * | 6/1998 | Matsumoto et al. | 382/194 |
| 5,907,630 | A * | 5/1999 | Naoi et al. | 382/173 |
| 6,006,240 | A * | 12/1999 | Handley | 715/220 |
| 6,173,073 | B1 * | 1/2001 | Wang | 382/176 |
| 6,725,426 | B1 * | 4/2004 | Pavlov | 715/205 |
| 6,757,870 | B1 * | 6/2004 | Stinger | 715/234 |
| 6,976,226 | B1 * | 12/2005 | Strong et al. | 715/788 |
| 7,089,492 | B2 * | 8/2006 | Anderson | 715/239 |
| 2002/0106124 | A1 * | 8/2002 | Wang | 382/173 |
| 2004/0015539 | A1 * | 1/2004 | Alegria et al. | 709/203 |
| 2006/0048127 | A1 * | 3/2006 | Smith et al. | 717/162 |
| 2006/0101058 | A1 * | 5/2006 | Chidlovskii | 707/102 |

* cited by examiner

*Primary Examiner*—Adam L Basehoar
*Assistant Examiner*—Yasin Patterson

(57) ABSTRACT

Various technologies and techniques detect tables in vector graphics based documents and use them in meaningful ways. The system detects at least one table in a vector graphics based document using a set of rules. The rules include analyzing a set of content representing horizontal and vertical lines to find intersections and identifying table cells based on the intersections. Once identified, the table content is translated into a modified format. The content can be output to a destination application in the modified format that is more suitable for output or use by the destination application.

17 Claims, 11 Drawing Sheets

480

482

484

486

```
<!-- Table borders -->
<Path Stroke="#000000" Data="M 20,20 L 520,20" />
<Path Stroke="#000000" Data="M 20,70 L 520,70" />
<Path Stroke="#000000" Data="M 20,120 L 520,120" />
<Path Stroke="#000000" Data="M 20,170 L 520,170" />
<Path Stroke="#000000" Data="M 20,220 L 520,220" />
<Path Stroke="#000000" Data="M 20,270 L 520,270" />
<Path Stroke="#000000" Data="M 20,20 L 20,270" />
<Path Stroke="#000000" Data="M 190,20 L 190,270" />
<Path Stroke="#000000" Data="M 360,20 L 360,270" />
<Path Stroke="#000000" Data="M 520,20 L 520,270" />
<!-- Table header content -->
        <Glyphs OriginX="67" OriginY="50" FontRenderingEmSize="14"
UnicodeString="First Name" FontUri="C:\Windows\Fonts\Arialbd.ttf"
Fill="#000000"/>
        <Glyphs OriginX="240" OriginY="50" FontRenderingEmSize="14"
UnicodeString="Last Name" FontUri="C:\Windows\Fonts\Arialbd.ttf"
Fill="#000000"/>
        <Glyphs OriginX="406" OriginY="50" FontRenderingEmSize="14"
UnicodeString="Salutation" FontUri="C:\Windows\Fonts\Arialbd.ttf"
Fill="#000000"/>
<!-- Table row content -->
        <Glyphs OriginX="30" OriginY="100" FontRenderingEmSize="12"
UnicodeString="John" FontUri="C:\Windows\Fonts\Arial.ttf" Fill="#000000"/>
        <Glyphs OriginX="200" OriginY="100" FontRenderingEmSize="12"
UnicodeString="Smith" FontUri="C:\Windows\Fonts\Arial.ttf" Fill="#000000"/>
        <Glyphs OriginX="370" OriginY="100" FontRenderingEmSize="12"
UnicodeString="Mr." FontUri="C:\Windows\Fonts\Arial.ttf" Fill="#000000"/>
        <Glyphs OriginX="30" OriginY="150" FontRenderingEmSize="12"
[portions omitted...]
UnicodeString="Charlie" FontUri="C:\Windows\Fonts\Arial.ttf" Fill="#000000"/>
        <Glyphs OriginX="200" OriginY="250" FontRenderingEmSize="12"
UnicodeString="Peterson" FontUri="C:\Windows\Fonts\Arial.ttf" Fill="#000000"/>
        <Glyphs OriginX="370" OriginY="250" FontRenderingEmSize="12"
UnicodeString="Mr." FontUri="C:\Windows\Fonts\Arial.ttf" Fill="#000000"/>
  </Canvas>
[portions omitted...]
```

FIG. 8

E:\SAMPLES\TABLE.XPS

ADDRESS E:\SAMPLES\TABLE.XPS

...E:/SAMPLES/TABLE.XPS

PAGE 1 OF 4  100%

| FIRST NAME | LAST NAME | SALUTATION |
|---|---|---|
| JOHN | SMITH | MR. |
| JANE | DOE | MRS. |
| KATIE | HARPER | MS. |
| CHARLIE | PETERSON | MR. |

| CHARACTER | FIRST APPEARANCE | LAST APPEARANCE |
|---|---|---|
| JOHN | A MAN BURST THROUGH THE DOOR, YELLING WITH EXCITEMENT "IT'S SNOWING OUTSIDE" | JOHN STORMED BACK OUTSIDE |
| JANE | THE PHONE RANG LOUDLY, WAKING JOHN. HE ANSWERED "IT'S ME JANE" SHE SAID | "I MUST BE GOING, SHE SAID" AND HUNG UP. |
| KATIE | KATIE JUMPED INTO THE CAR | SHE HOPPED OUT. |
| CHARLIE | A MAN SHOUTED FROM OUTSIDE "IT'S TIME" CHARLIE WAS BACK. |  |

| FIRST NAME | LAST NAME | SALUTATION |
|---|---|---|
| JOHN | SMITH | MR. |
| JANE | DOE | MRS. |
| KATIE | HARPER | MS. |
|  | PETERSON | MR. |

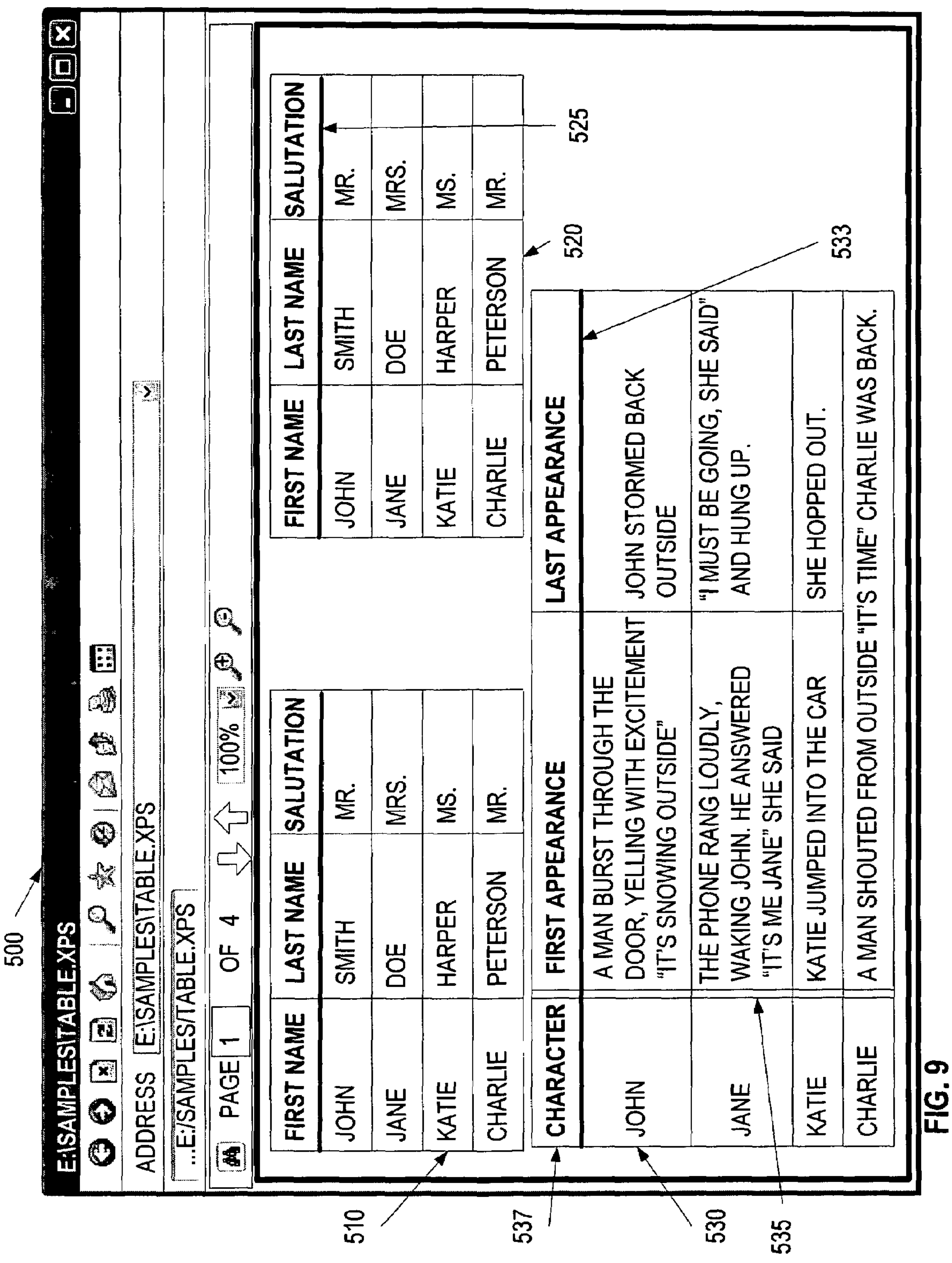

FIG. 9

ANALYZING LINES TO DETECT TABLES IN DOCUMENTS

BACKGROUND

Vector graphics based document exchange formats, such as a portable document format (PDF), provide a set of rendering instructions that allow documents to be interpreted and displayed to users in a standardized fashion, without requiring a user's computer to have the original software application that the content was created in. MICROSOFT® created XML Paper Specification (XPS) as a vector graphics based document format to allow XML content to be rendered in a standardized and meaningful way. One problem with vector graphics based documents is that viewing applications may know very little about the real content of a particular document except for how to render it correctly. For example, the viewing application may have no idea that the content of the document includes one or more tables.

Tables are widely used in documents because they can deliver large amounts of information in ways that are easier to read and understand than plain text. The presence of tables in a document presents particular problems when converting vector graphics based documents to more-end-user friendly formats. Viewing applications will have information describing how to draw the table, but they do not necessarily have any information indicating that what they are drawing is a table, so they may be limited in their ability to read or copy the text in the table in a way that is meaningful to the user. The issue of detecting tables is also complicated by the potential presence of nested tables, or tables within tables.

SUMMARY

Various technologies and techniques are disclosed that allow detecting tables within vector graphics based, including XML based, documents and rendering them in meaningful ways. Single-level tables as well as nested tables can be identified based on a set of rules. This includes searches for a particular succession of vertical and horizontal lines that may start a table and/or indicate a cell within a table. Grid patterns are searched for in subsequent lines to determine if a table exists. Recognized groupings of lines and patterns form the basis for identifying a table. False positives are eliminated by applying additional criteria to items initially identified as tables. The system allows content to be output to destination applications in a modified format that is more suitable for output or use by a destination application. Alternatively or additionally, tables can be recognized and translated to a screen reader that understands the input and utilizes voice output technology to make proper audible sounds to represent the table.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 8 is a diagram for one implementation of the system of FIG. 1 that illustrates a vector graphics based document in an XML format designating a table.

FIG. 9 is a simulated screen for one implementation of the system of FIG. 1 that illustrates how the XML table content of FIG. 8 is visualized by a document rendering utility.

DETAILED DESCRIPTION

Figure 1:
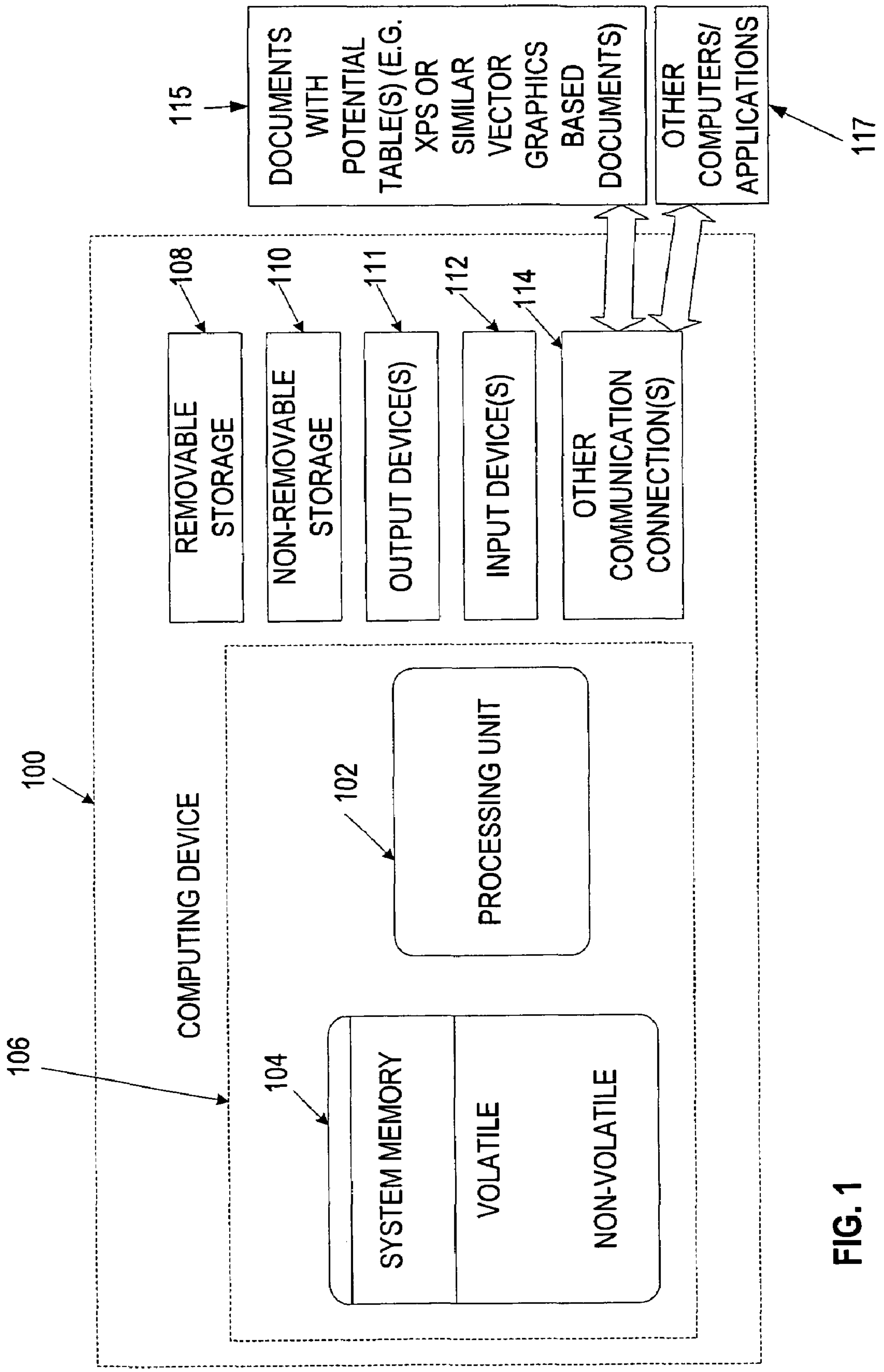
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that detects tables based on the rendering instructions given in an XPS document or other vector graphics based document formats, but the system also serves other purposes in addition to these. One or more of the techniques described herein can be implemented as features within software programs such as MICROSOFT® Office Word, MICROSOFT® Office POWERPOINT®, Adobe Acrobat, XPS viewers, and/or from any other type of program or service that allows creation or utilization of tables. As described in further detail herein, in one implementation of the system, applications can recognize tables and translate them to a format used in one or more destination documents. In yet another implementation, tables can be recognized and translated to a screen reader that understands the input and utilizes voice output technology to make proper audible sounds identifying the table, read the header and text for each cell, and explain the order of the table to the person who is listening. In another implementation, one or more of these technologies and/or techniques can be used to detect tables whose lines are parallel and perpendicular, but not necessarily pitched at 90° and 180°. As another non-limiting example, one or more technologies and/or techniques could be used to read tables placed at an angle, such as in a magazine ad.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with one or more documents 115, such as XPS documents or other vector graphics based documents. Computing device 100 may also communicate with one or more computers and/or applications 117. Device 100 may also have input device(s) 112 such as keyboard, mouse, pen, voice input device, touch input device, etc. Output device(s) 111 such as a display, speakers, printer, screen reader, etc. may also be included. These devices are well known in the art and need not be discussed at length here.

Figure 2:
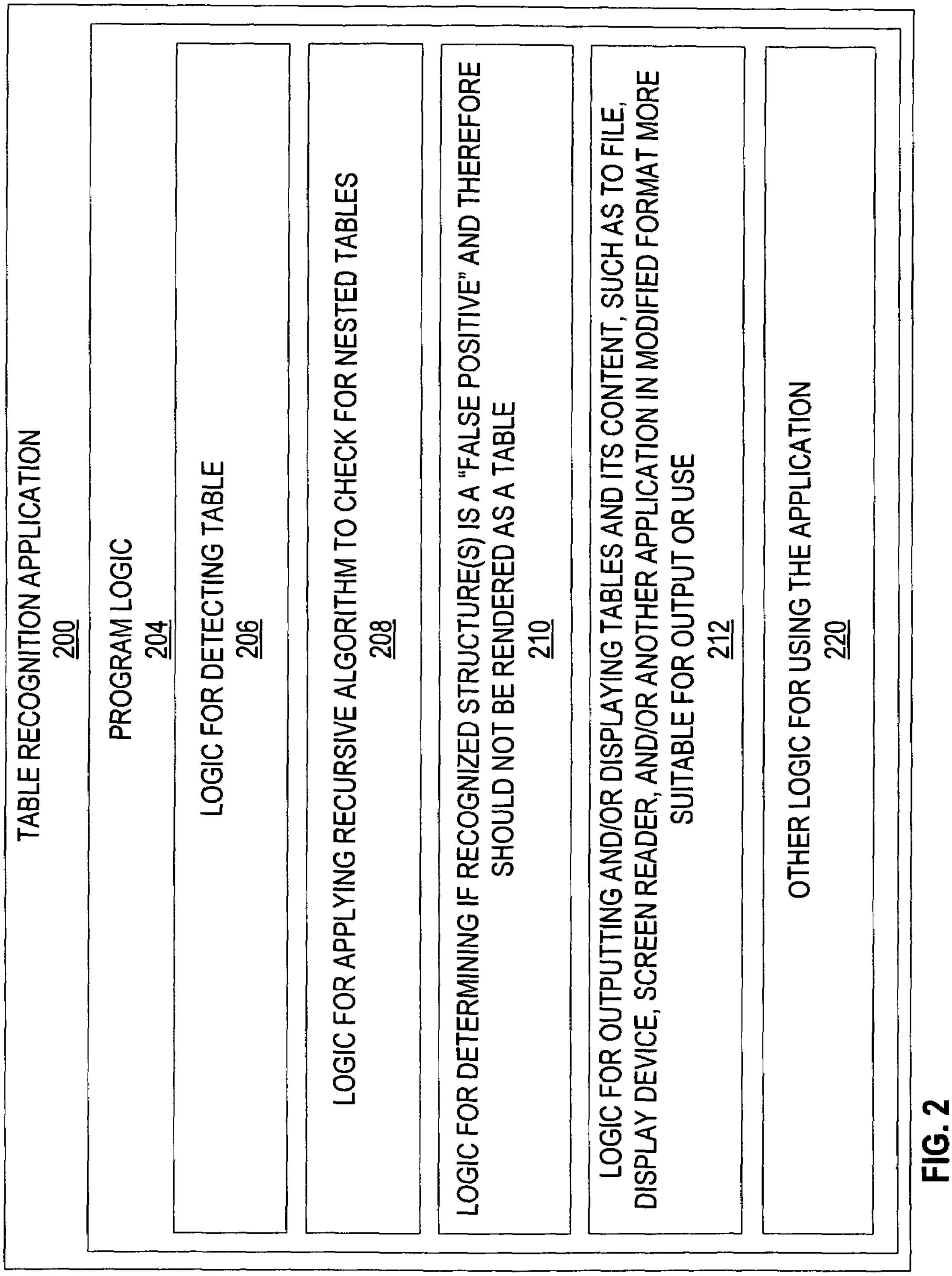
FIG. 2 is a diagrammatic view of the table recognition application of one implementation operating on the computer system of FIG. 1.

Turning now to FIG. 2 with continued reference to FIG. 1, table recognition application 200 operating on computing device 100 is illustrated. Table recognition application 200 is one of the application programs that reside on computing device 100. Alternatively or additionally, one or more parts of table recognition application 200 can be part of system memory 104, on other computers and/or applications 117, or other such variations as would occur to one in the computer software art.

Table recognition application 200 includes program logic 204, which is responsible for carrying out some or all of the techniques described herein. Program logic 204 includes logic for detecting a table 206 and detecting a nested table within that table 208. Program logic 210 checks for potential "false positives;" that is, items that appear to be a table but are not. Program logic 204 also includes the logic for outputting or displaying the table(s) and its contents in a modified format more suitable for output or use 212, such as to a file, display device, screen reader, and/or another application. Other logic for operating the application is also included 220. In one implementation, program logic 204 is operable to be called programmatically from another program, such as using a single call to a procedure in program logic 204.

In one implementation, program logic 204 resides on computing device 100. However, it will be understood that program logic 204 can alternatively or additionally be embodied as computer-executable instructions on one or more computers and/or in different variations. As one non-limiting example, one or more parts of program logic 204 could alternatively or additionally be implemented as a web-based application that is called when needed.

Figure 3:
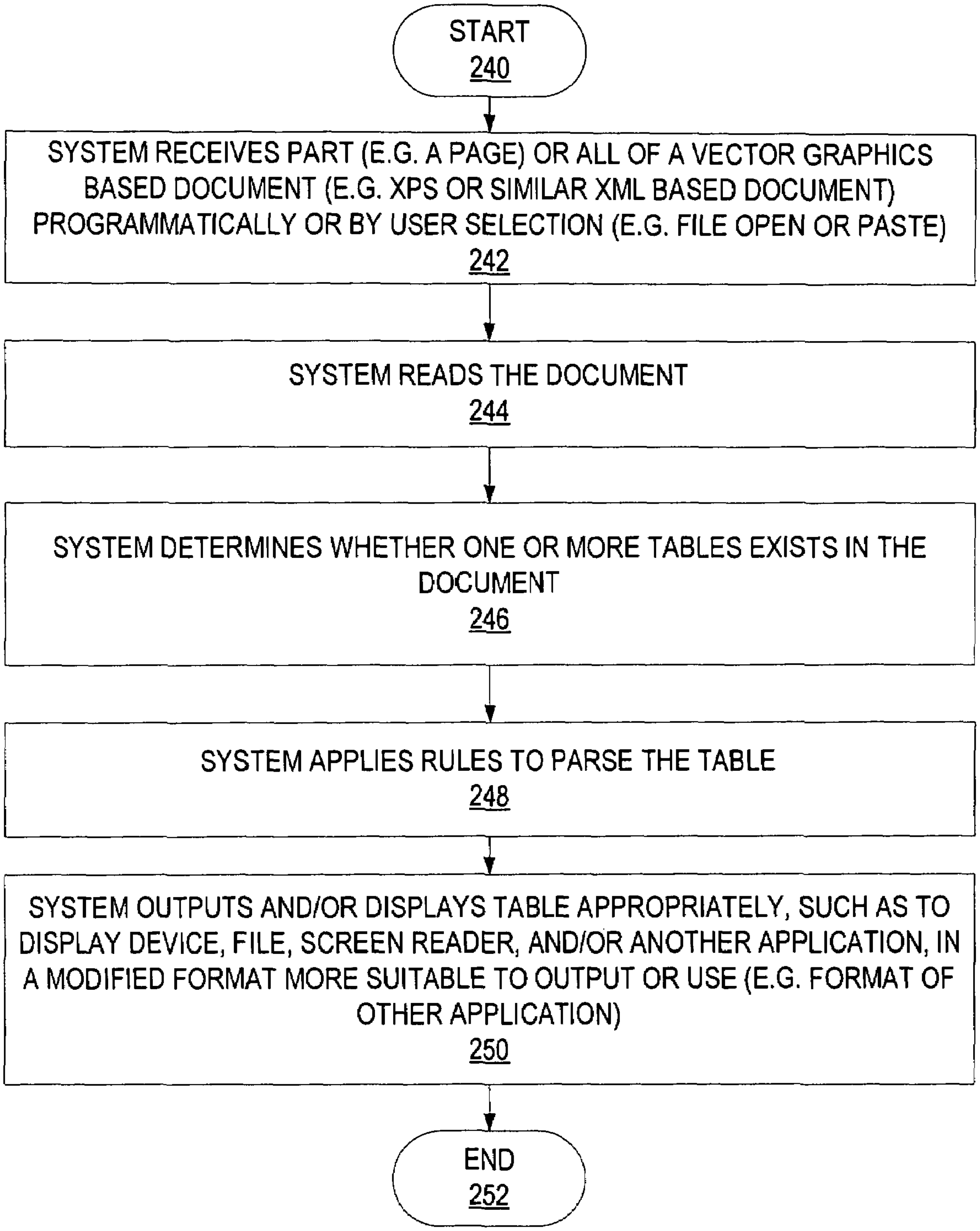
FIG. 3 is a high-level process flow diagram for one implementation of the system of FIG. 1.

Turning now to FIG. 3 with continued reference to FIGS. 1-2, the stages for implementing one or more implementations of table recognition application 200 are described in further detail. FIG. 3 is a high level flow diagram for table recognition application 200. In one form, the process of FIG. 3 is at least partially implemented in the operating logic of computing device 100. While table recognition application 200 is described in some implementations herein as recognizing tables in XPS documents or similar XML based document formats, it will be understood that in other implementations, table recognition application 200 works with any type of document format that makes use of vector graphics. The term vector graphics based document as used herein is meant to include any type of document that includes instructions for rendering a document on an output device, such as instructions for rendering text, lines, and/or filled shapes. Another non-limiting example of rendering instructions includes table rendering instructions, such as those providing details about the location of horizontal and vertical lines making up a table. In one implementation, vector graphics based documents include document rendering instructions written in a text-based format, such as XML.

The procedure of FIG. 3 begins at start point 240 with receiving a selection programmatically from a program, or from a user, to access part (e.g. a page) or all of a vector graphics based document, such as an XPS document or similar XML based document (stage 242). A few non-limiting examples of how the selection is received include a file opened by a user, or text pasted into an application by a user. In one implementation, the system reads the document (stage 244) and executes program logic 206 to determine whether a table is present in the document (stage 246). Program logic 210 is executed to make sure that the table meets the system definitions and criteria for being a table (stage 246). Table recognition application 200 executes program logic 206 to interpret the table correctly (stage 248). In one implementation, the system groups the horizontal lines together, groups the vertical lines together, optionally gets rid of extra lines that are close together (e.g. double-underlines that should be only counted once), and analyzes the remaining groups of lines to detect intersections (stage 248). System executes program logic 212 to output the one or more tables in a modified format that is more suitable to output or use, such as to a file, display, screen reader, and/or another application (stage 250). In one implementation, the modified format includes a format understood by a destination application. The process ends at end point 252.

Figure 4:
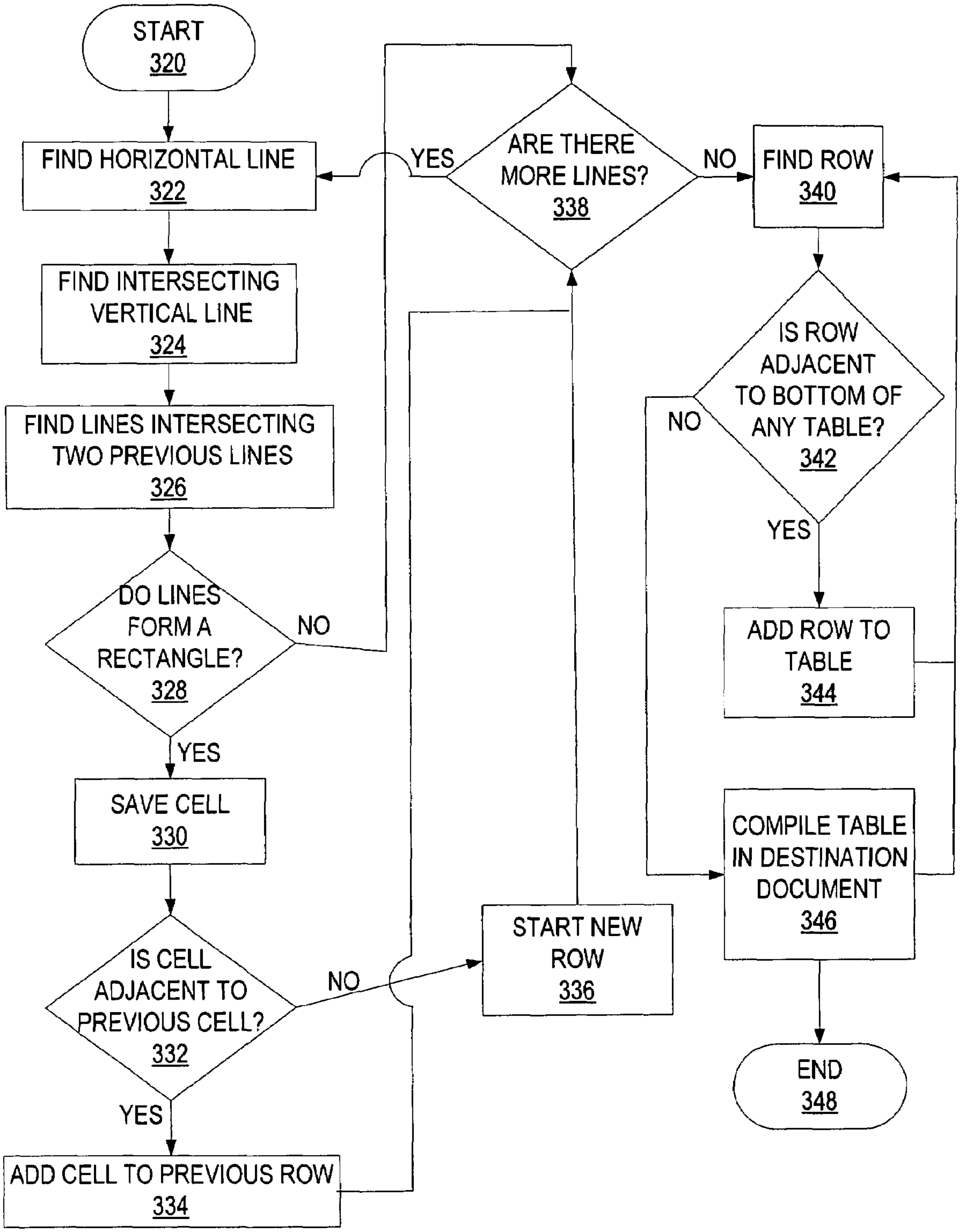
FIG. 4 is a process flow diagram for one implementation of the system of FIG. 1 illustrating the stages involved in detecting and rendering a table from vector graphics content.
Figure 5:
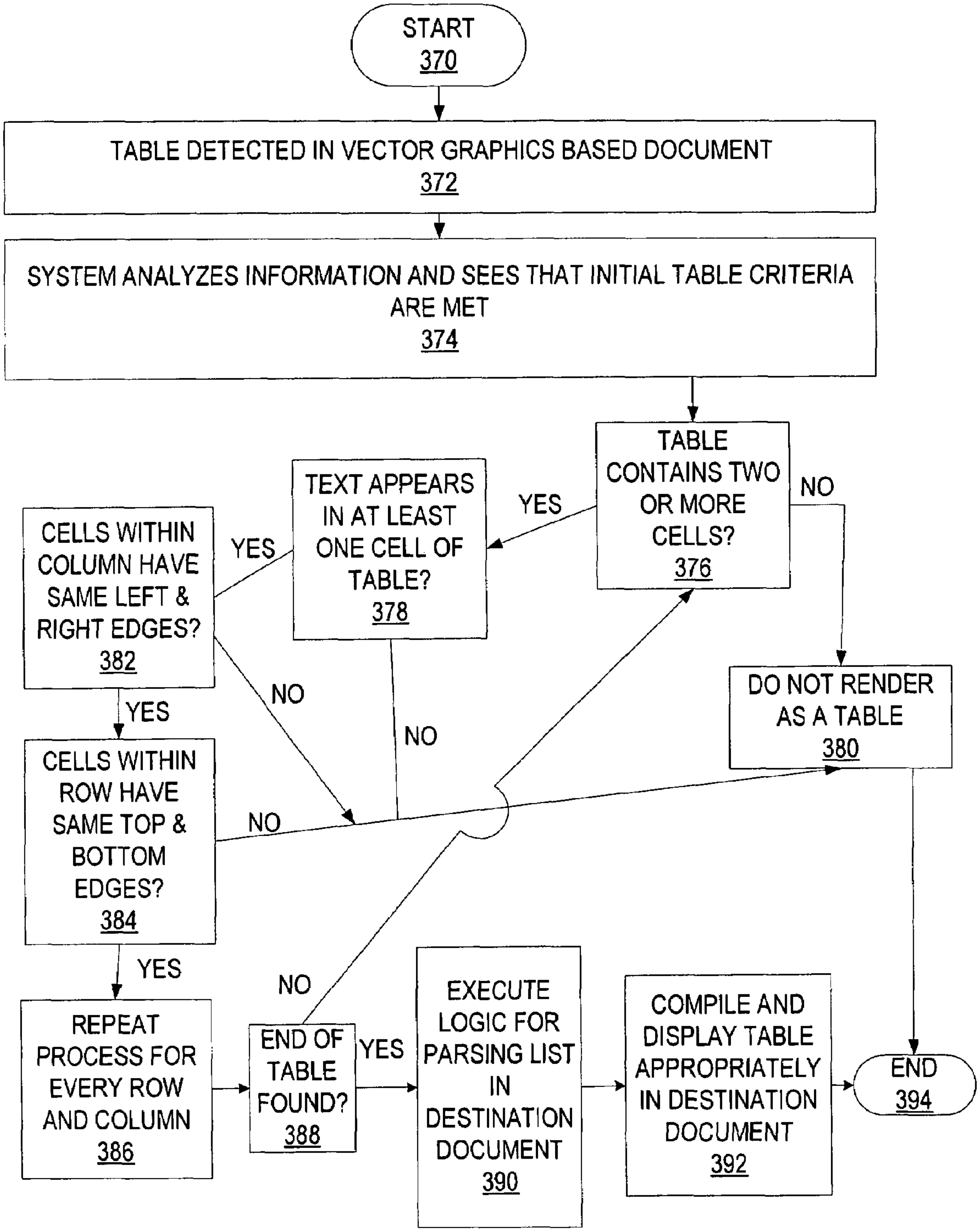
FIG. 5 is a process flow diagram for one implementation of the system of FIG. 1 illustrating the stages involved in detecting false positives and removing them so they do not appear in a destination document as a table.

Turning now to FIGS. 4-5 with continued reference to FIGS. 2-3, FIGS. 4 and 5 illustrate the stages involved in detecting a table. FIG. 4 illustrates the stages for detecting table content in one implementation. In one form, the process of FIG. 4 is at least partially implemented in the operating logic of computing device 100. The procedure begins at start point 320 with the content from the source document being analyzed for the first instance of a horizontal line (stage 322). The system detects the first intersecting vertical line (stage 324) that could be the start of a table. The system looks for another horizontal line to intersect the found vertical line; then the next vertical line that intersects both horizontal lines (stage 326). If these four lines form a rectangle (decision point 328), then the first cell of a potential table is identified and saved (stage 330).

That cell is used for reference to see if the same pattern of lines occurs adjacent to it (decision point 332) or below it (decision point 340). If at least one more cell is found adjacent to the first (decision point 332), then those two cells are identified as a row (stage 334). Specifically, if at least one more cell is found that shares the same top and bottom line as the previous cell and the left edge is the last cell's right edge, then this cell is in the same row as the last cell found. If at least one cell is found below the first, it is identified as the start of a new row (stage 336). The process continues to look for more lines (decision point 338) and identifying more rows 340, including any that are adjacent to the perceived bottom of the table (stage 342). The system scans the document from top to bottom. Any row whose top edge is the same as a prior row's bottom edge is considered part of the same table (stage 344). When the table is fully identified, program logic 212 compiles the table in the destination application (stage 346). In one implementation, part of the process for compiling the table includes determining a correct column span for each cell in the table. As one non-limiting example, if certain cells are in the same column, they should have the same right edge. The process ends at end point 348.

FIG. 5 illustrates additional considerations taken in one implementation to ensure that "false positives" are not included as tables. In one form, the process of FIG. 5 is at least partially implemented in the operating logic of computing device 100. Documents can contain elements that have some characteristics of a table—for example, something can be bounded by a rectangle—but still not be a table. This process begins at start point 370, when an application recognizes a vector graphics based document that appears to contain a table (stage 372). The system checks to see that all initial criteria for rendering a table have been met (stage 374).

The system executes program logic 210 to check for false positives. In one implementation, these checks include, but are not limited to, verifying that the table contains at least two cells (decision point 376), confirming that the table includes text (decision point 378), checking to see that column edges align (decision point 382) and/or that rows share the same top and bottom edges (decision point 384). Some or all of these checks are applied to each row of the table in succession 386 until the end of the table is found (stage 388). In one implementation, if any single criterion is not met, then the destination application knows not to render the information as a table (stage 380). In another implementation, fewer and/or additional criteria are used. However, if all criteria are met satisfactorily, then the destination application knows to render this as a table (stage 390) and outputs the table correctly, such as in the destination document (stage 392). This process ends at end point 394.

As discussed previously, in one implementation, table recognition application 200 can also detect nested tables. A nested table is a table comprised of at least two cells that are contained within a cell of a higher-level table. By way of example and not limitation, a web article may be contained in a table. Bullet marks and text blocks following the bullets are separate cells within the nested table. To identify one or more nested tables, program logic 208 employs a recursive algorithm. This is a manner of applying rules to identify tables and the system loops back to apply the same rules to each cell within a table. Any number of nested tables may be detected and interpreted this way.

Figure 6:
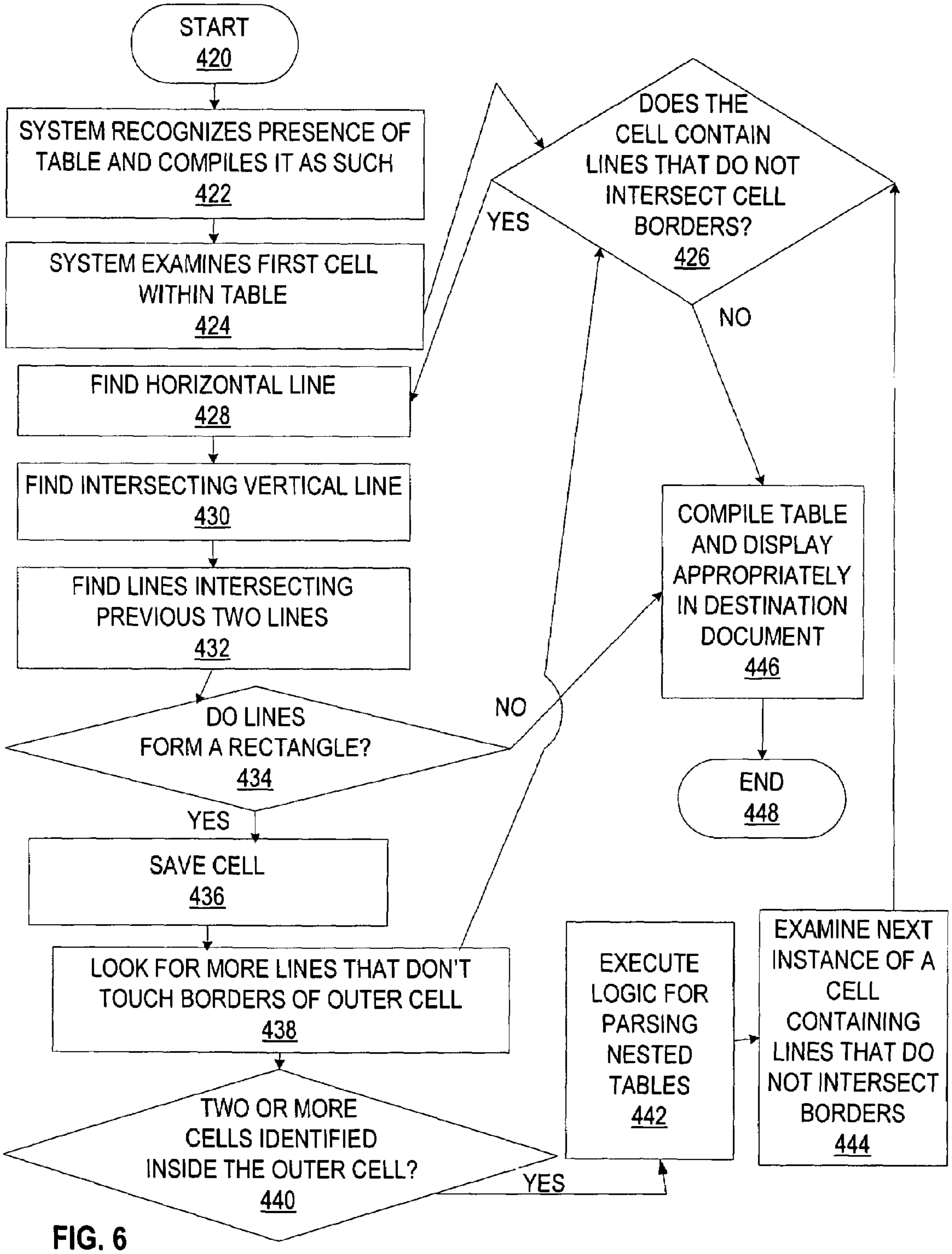
FIG. 6 is a process flow diagram for one implementation of the system of FIG. 1 illustrating details of the stages involved in detecting and rendering nested tables.

FIG. 6 shows the stages involved in identifying nested tables in one implementation. In one form, the process of FIG. 6 is at least partially implemented in the operating logic of computing device 100. FIG. 6 expands on program logic 208 to illustrate how the system processes details involved in identifying nested tables and displaying them correctly. The process begins at start point 420 with recognizing a vector graphics based document that contains table content (stage 422). The system locates the first cell within the table (stage 424) and examines it to see if it contains a nested table. The process first looks for lines within the cell that do not intersect the cell's borders (stage 426). If one or more non-intersecting lines are found (decision point 426), then the process continues, applying the same criteria as employed in FIG. 4 in looking for patterns of horizontal (stage 428) and vertical lines (stage 430), and their intersections (stage 432).

If the lines intersect and form a rectangle (decision point 434), then a nested cell is identified (stage 436). Since a table is defined to be two or more cells, the same applies to a nested table. Therefore, the next step is to find a cell adjacent to or underneath the first nested cell, with borders that touch only the nested cell (stage 438). If this is found (stage 440), then the system engages rules for identifying a nested table in that cell (stage 442). The process continues (stage 444) until all cells in the table are examined for nested tables. When that is complete, the system employs program logic 212 to group and compile information accordingly and display all levels of tables in the destination document (stage 446) onscreen or in print. In the implementation just described, the system is detecting one table first, and then looking for tables nested within that identified table. In another implementation, the system checks for nested tables as part of the process of detecting a first table to begin with. The process ends at end point 448. In one implementation, testing for false positives, as described previously, is also employed on all nested tables.

Figure 7:
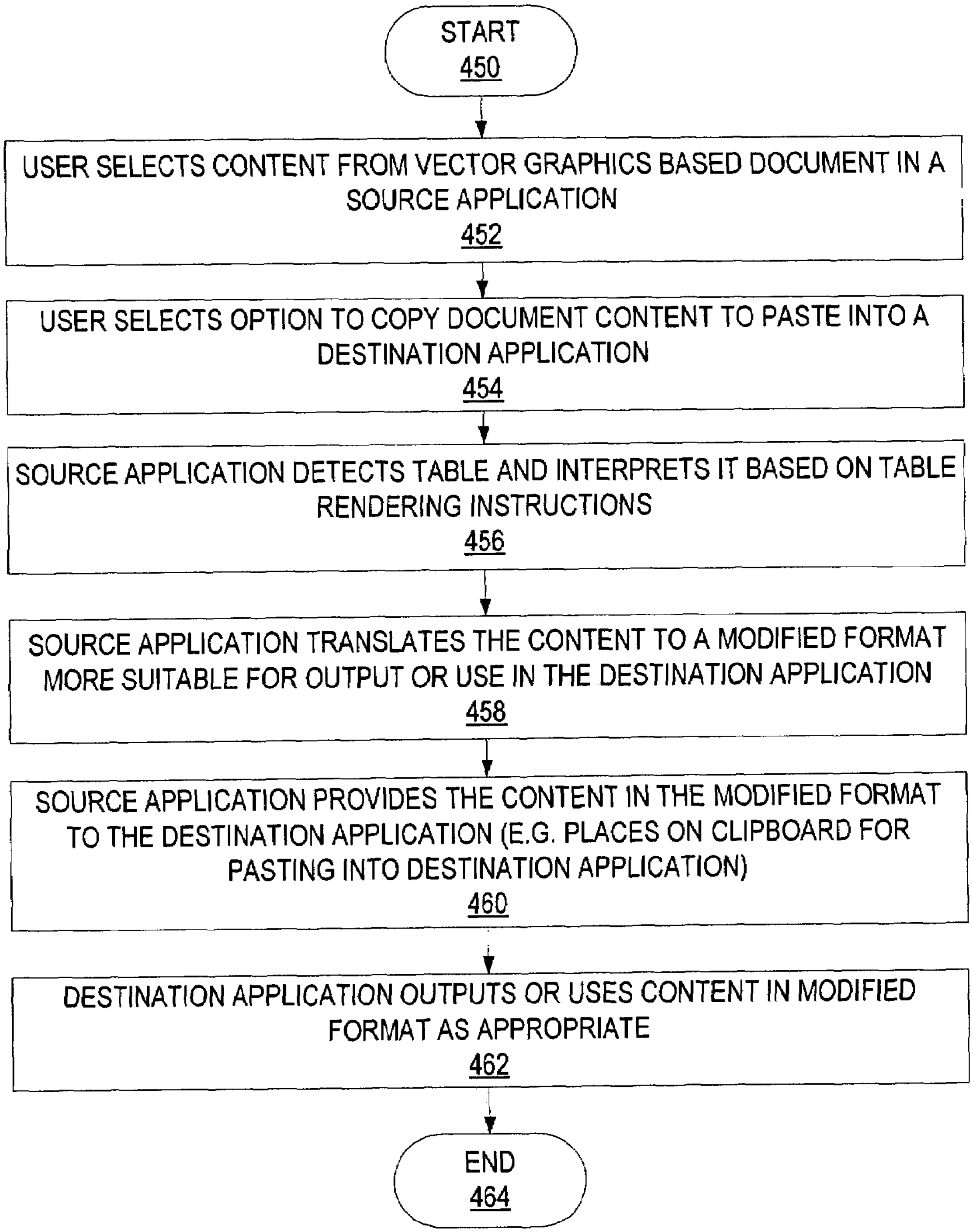
FIG. 7 is a flow diagram for one implementation of the system of FIG. 1 that illustrates the copying and pasting process from a vector graphics based document to a destination application.

FIG. 7 is a high-level flow diagram of table recognition application 200, showing the process that a user would employ to copy and paste table content from a vector graphics based document into a destination application or document that utilizes a different format. In one form, the process of FIG. 7 is at least partially implemented in the operating logic of computing device 100. The process begins at start point 450, when the user selects content from a vector graphics based document in a source application (stage 452). The user selects an option to copy the content to paste into a destination application (stage 454). The source application detects the presence of a table and interprets the table based on table rendering instructions present in the document (stage 456). The source application translates the content to a modified format that is more suitable for output or use in the destination application (stage 458). A few non-limiting examples of modified content include rich text, XML that does not include rendering instructions, a graphic representation of some or all of the content, and numerous other variations. The source application provides the modified content to the destination application (stage 460). As one non-limiting example, the source application can provide the modified content by placing it on a clipboard that can be used to paste the content into the destination application programmatically or by user selection. The destination application outputs or uses the modified content appropriately, such as rendering it on an output device for a user (stage 462). The process ends at point 464.

Figure 10:
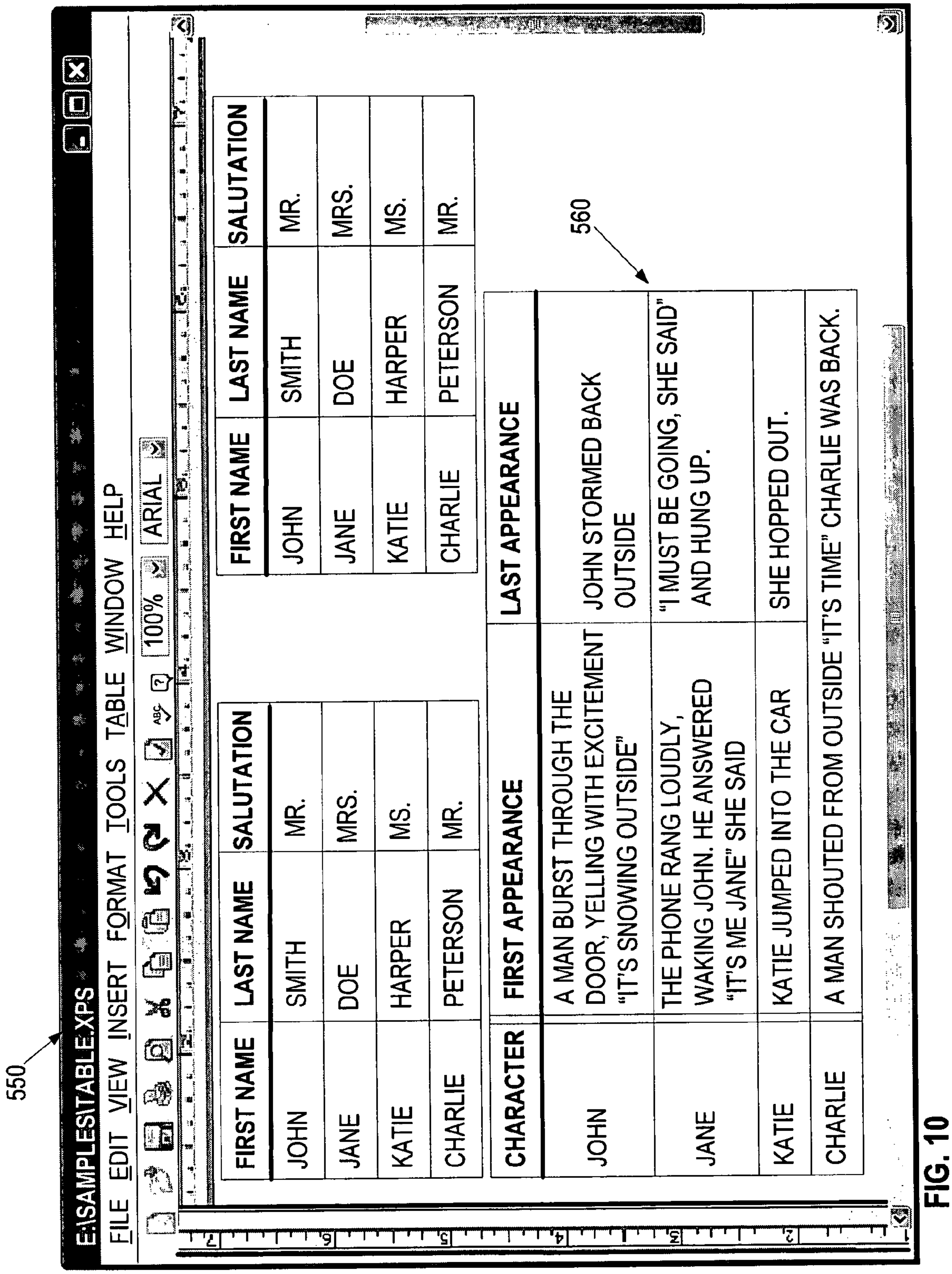
FIG. 10 is a simulated screen for one implementation of the system of FIG. 1 showing how the XML table content of FIG. 8 is rendered after being copied to another application which uses a different document format.

Turning now to FIGS. 8-10, simulated diagrams and screens are shown to illustrate one implementation of native XML code and tags, as well as how the XML code is interpreted by a source application, such as a viewer, and then displayed in a destination application. FIG. 8 shows XML code 480, which may, in one implementation, be received from a source such as an XPS document or other vector graphics based document 115. In the example shown, document 480 includes Path Stroke tags 482 for each table border, tags for each table header 484, and tags for each table's row content 486. In the example shown, the XML code is written using an XML paper specification (XPS) syntax. Note that the table borders are specified in text-based coordinates, along with the table contents. Numerous other ways for representing tables and content in a vector graphics based document can also be used. Furthermore, some, all, additional, and/or other tags and/or text contents could be used with document 480. In other implementations, XML tags are not used at all.

FIG. 9 is a simulated screen 500 for one implementation that illustrates how XML content 480 is displayed in a more user-friendly fashion in a viewer application. Table(s) 510, 520, and 530 are displayed using formatting and lines. Content is displayed in the respective cells. Note that each table contains different combinations of lines. Table 520 contains a thick line 525 separating the column headings from the content. Table 530 contains both a thick line 533 separating the column headings from content and a double line 535 separating the Character column 537 from the rest of the columns. In one implementation, list interpreter application 200 can account for double lines without counting the narrow spaces between the lines as cells.

FIG. 10 is a simulated screen 550 that displays XML content in a destination application that was copied, translated, and pasted into the destination application in a modified format, or just opened from the destination application and then translated to the modified format. Note that the table 560 is displayed, with each column heading and cell content in the proper order.

Figure 11:
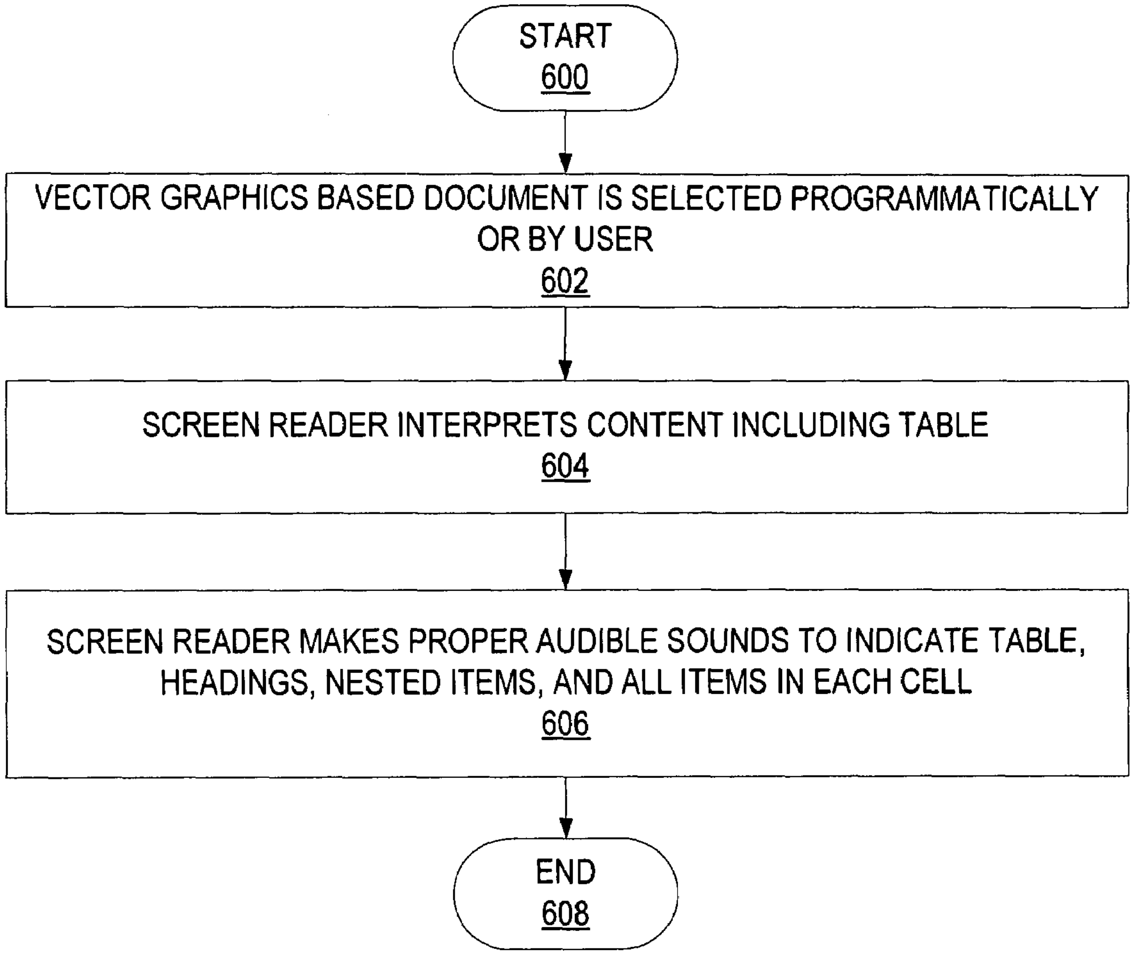
FIG. 11 is a flow diagram for one implementation of the system of FIG. 1 that illustrates a screen reader using this technology to render audible output for a table.

FIG. 11 shows a flow diagram of a screen reader using table recognition program 200 in one implementation. In one form, the process of FIG. 11 is at least partially implemented in the operating logic of computing device 100. A screen reader describes what is on a computer screen for someone who cannot clearly see or interpret what is on the screen. Screen readers are helpful tools for people from various disability groups. The power of an audible text equivalent for something that is not solely comprised of text lies in its capacity to render the information in ways that are accessible and meaningful to these people. A table is comprised of text, lines, tabular content, and the "relatedness" of the information. In one implementation, some or all of these components must be verbalized. As one non-limiting example, the screen reader can recognize and verbalize the presence of a table, its headers, divisions, contents and/or relationships in a way that the user can understand.

FIG. 11 begins at start point 600, with the user or the system selecting content in a vector graphics based document (stage 602). The screen reader uses program logic 206, 208, and 210 to detect the presence of a table and interpret its content (stage 604). Program logic 212 is executed to display, and in this case, audibly relay the information in a meaningful way (stage 606). By way of example and not limitation, a screen reader's audible output for a table could include these spoken words: "Table. First heading: [read the text]; second heading: [read the text]; third heading [read the text]." By way of another example and not limitation, a screen reader's audible output for a row of information could include these spoken words: "First row, first cell: [read the text]. First row, second cell: [read the text]." The process then ends at end point 608.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method for recognizing tables in vector graphics based documents comprising:
- receiving a document in an original format, the original format having at least a set of table rendering instructions for at least one table in the document;
- parsing the document to determine that the document comprises at least one table and at least one nested table and to identify a set of contents for the table; and
- outputting the table and the nested table to an output medium, the output medium presenting the table in a modified format, where determining that the document comprises at least one nested table comprises:
- analyzing a first cell of the table to determine whether the first cell comprises lines therein that do not intersect borders of the first cell, and
- upon analyzing the first cell and finding a first nested cell, utilizing the first nested cell as a reference and determining if a second nested cell occurs adjacent to or below the first nested cell.

2. A method for recognizing tables in vector graphics based documents comprising:
- receiving a document in an original format, the original format having at least a set of table rendering instructions for at least one table in the document;
- parsing the document to determine that the document comprises at least one table and at least one nested table and to identify a set of contents for the table; and
- upon determining that the document comprises at least one table, determining that the table does not comprise a false positive, comprising: verifying that the table comprises a first cell and a second cell; confirming that the table comprises text;
- checking that column edges of the table align; and checking that rows of the table share top and bottom edges.

3. The method of claim 1, wherein the output medium comprises a screen reader, and wherein a set of contents in the table are described audibly to a user.

4. The method of claim 1, comprising regarding double lines as a single line and not regarding spacing between the double lines as a cell.

5. The method of claim 1, wherein the document comprises an XML paper specification format.

6. The method of claim 1, wherein parsing the document comprises:
- analyzing a set of text representing a plurality of horizontal and vertical lines to find intersections, and identifying a plurality of table cells based on the intersections.

7. A method for recognizing tables in vector graphics based documents comprising:
- receiving a document in an original format, the original format having at least a set of table rendering instructions for at least one table in the document; and
- parsing the document to determine that the document comprises at least one table and at least one nested table and to identify a set of contents for the table, where parsing the document comprises:

grouping a plurality of horizontal lines together, grouping a plurality of vertical lines together, looking for intersections that are present between the horizontal lines and the vertical lines, and identifying a plurality of table cells based on the intersections and where identifying a plurality of table cells comprises:

determining whether intersecting horizontal and vertical lines form a first table cell; and using the first table cell as a reference cell to determine if a same pattern occurs adjacent to the first table cell or below the first table cell.

8. The method of claim 1, wherein receiving the document is performed when receiving an input to copy a section of content to a destination application; wherein the receiving and parsing are performed by a source application; wherein the modified format is created by the source application and transmitted to the destination application for outputting to the output medium; and wherein the modified format comprises a format used by the destination application.

9. A computer-readable storage medium having computer-executable instructions for causing a computer to perform the steps recited in claim 1.

10. A computer-readable storage medium having computer-executable instructions for causing a computer to perform a method comprising:

detecting at least one table within a vector graphics based document using a set of rules, the rules comprising:

analyzing a set of content representing at least one horizontal and vertical line to find intersections; and identifying a plurality of table cells based on the intersections;

determining that the document comprises at least one nested table comprising:

analyzing a first cell of the table to determine whether the first cell comprises lines therein that do not intersect borders of the first cell, and upon analyzing the first cell and finding a first nested cell, utilizing the first nested cell as a reference and determining if a second nested cell occurs adjacent to or below the first nested cell;

translating the at least one table to a modified format; and outputting the modified format to an output medium.

11. The computer-readable storage medium of claim 10, wherein the document comprises an XML document.

12. The computer-readable storage medium of claim 10, wherein the document comprises an XML paper specification format.

13. The computer-readable storage medium of claim 10, wherein the output medium is selected from a group comprising a display device, a file, a screen reader, and a separate application.

14. The computer-readable storage medium of claim 10, wherein the output medium comprises a screen reader, and wherein a set of table contents are described audibly to a user.

15. A method for interpreting vector graphics based documents comprising the steps of:

receiving an input from a user to copy a section of content, the content having an original format that includes a set of table rendering instructions;

interpreting the table rendering instructions to detect that the document comprises at least one table;

upon determining that the document comprises at least one table, determining that the table does not comprise a false positive, comprising: verifying that the table comprises a first cell and a second cell; confirming that the table comprises text;

checking that column edges of the table align and checking that rows of the table share top and bottom edges;

translating the content including the at least one table into a modified format; and providing the content in the modified format to the destination application for output.

16. The method of claim 15, wherein the section of content is selected from a document comprising an XML based format.

17. A computer-readable storage medium having computer-executable instructions for causing a computer to perform the steps recited in claim 15.

* * * * *